Dec. 13, 1966   V. W. WIBLE   3,291,253
TRACTOR FRONT LOADER
Filed July 6, 1965   3 Sheets-Sheet 1
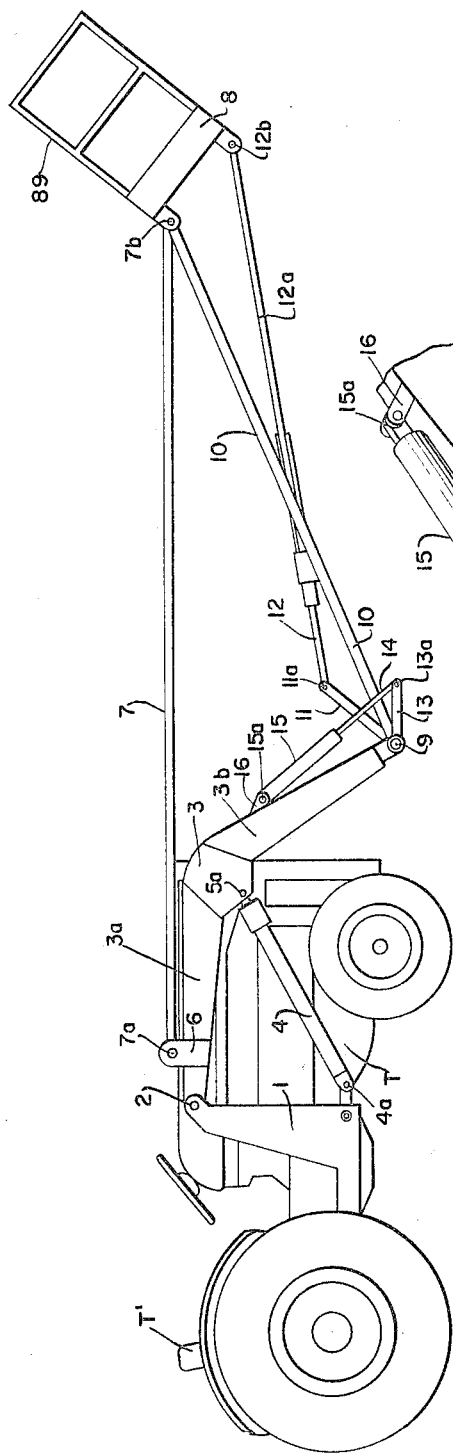
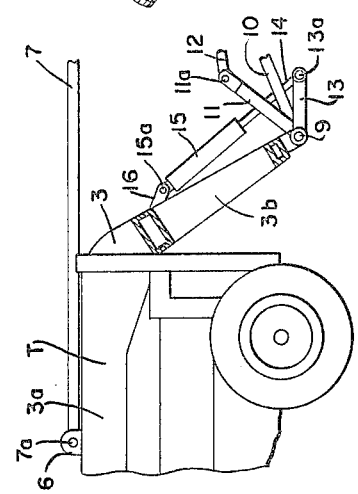
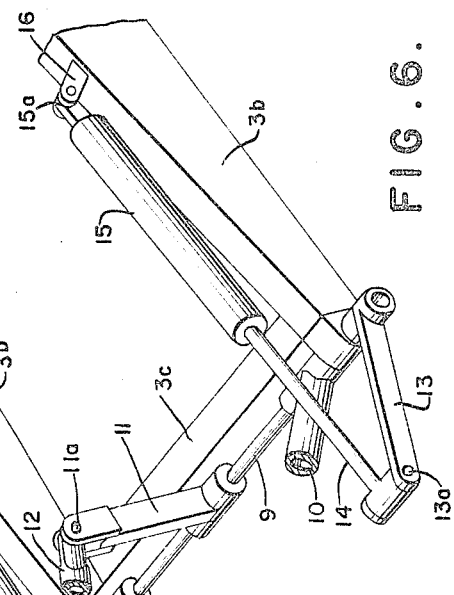
INVENTOR
Vernon W. Wible
BY
ATTORNEYS

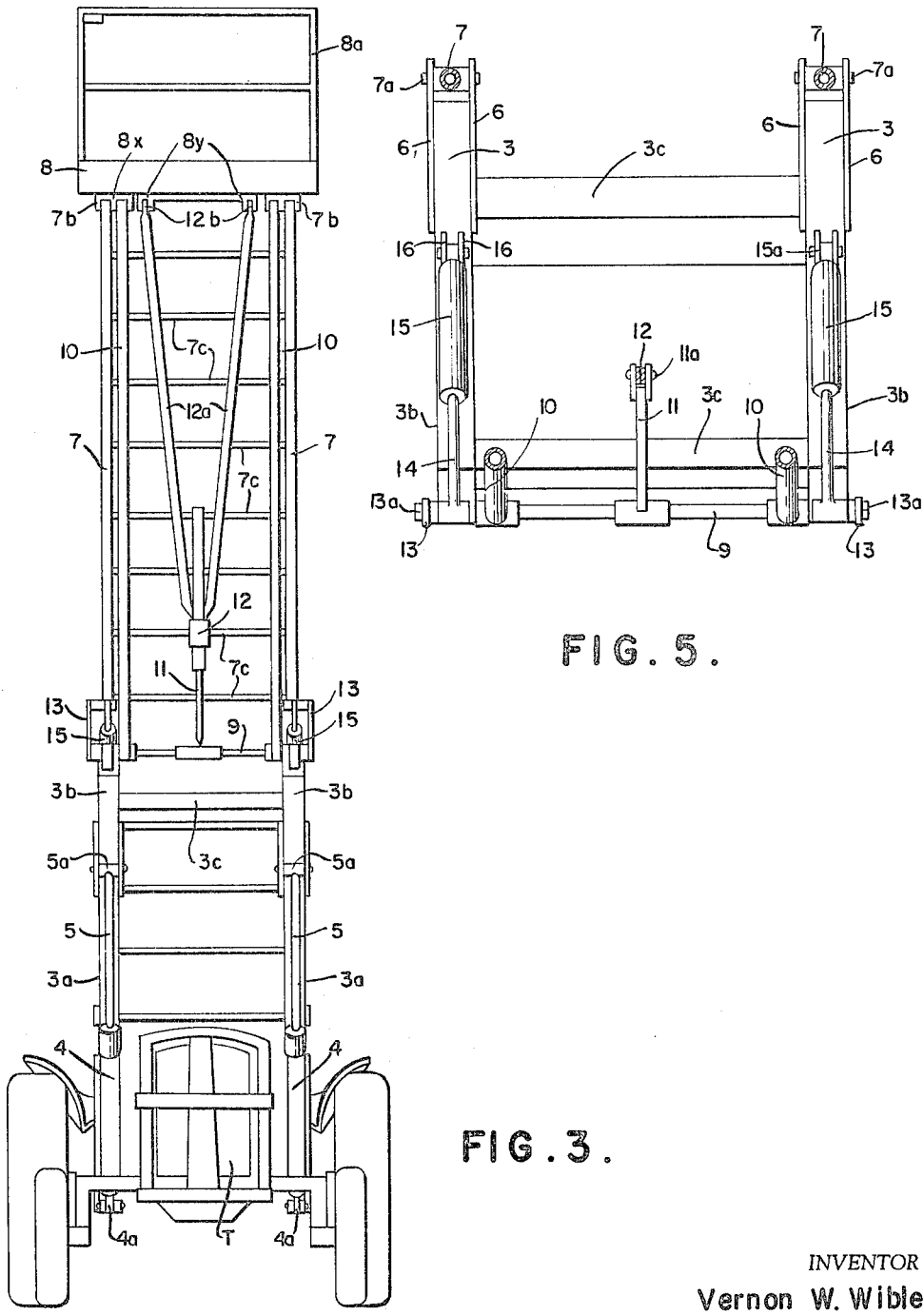

United States Patent Office 3,291,253
Patented Dec. 13, 1966

3,291,253
TRACTOR FRONT LOADER
Vernon W. Wible, 10307 74th St., W., Shawnee, Kans.
Filed July 6, 1965, Ser. No. 469,803
16 Claims. (Cl. 182—2)

This invention is a novel front loader attachment adapted to be removably mounted on a tractor, and the principal object of the invention is to provide a tractor front loader of the above type which is particularly adapted for use by workmen in the construction of antenna television systems, or used in connection with the installation and servicing of different types of aerial equipment, telephone lines, spray painting jobs or the like, the attachment comprising a pair of spaced parallel loader arms which are pivoted at their rear ends on the sides of the tractor and normally disposed substantially horizontally but adapted to be swung upwardly by means of a pair of power cylinders activated by the fluid power circuit of the tractor. The loader arms carry converging pairs of struts at their ends, the outer ends of which struts pivotally supports the rear end of a workman's platform, the front of the platform being pivotally supported by a bifurcated tilt arm actuated by a bell crank lever actuated by a pair of cylinders on the front ends of the loader arms also operated by the tractor fluid circuit and controlled from the workman's platform, whereby as the loader arms are raised and lowered the platform may be maintained substantially horizontally or may be tilted at any desired angle with respect to the work.

Another object of the invention is to provide a loader of the above type which is inexpensive to construct, is easily installed and removed from the tractor, and in which the platform can be raised to its full height while the platform is maintained substantially horizontal or tilted to any desired angle with respect to the horizontal, and in which the platform can be lowered to within a few feet of the ground permitting easy entry and exit of the workman to and from the platform.

A further object of the invention is to provide a loader of the above type in which the platform supporting struts at the rear end of the platform are provided with spaced rungs extending therebetween forming a ladder, facilitating the entry and exit of the workmen to and from the platform in any elevation thereof in event of malfunctioning of the elevating and lowering means, and also enabling the loader to be operated by a single operator.

I will explain the invention with reference to the accompanying drawings, which illustrate one practical embodiment thereof to enable others familiar with the art to adopt and use the same, and will summarize in the claims the novel features of construction and novel combinations of parts, for which protection is desired.

In said drawings:

FIG. 1 is a side elevational view of my tractor front loader showing the platform in lowered tilted position.

FIG. 3 is a front elevational view of the parts shown in FIG. 2.

FIG. 4 is a partial side elevational view similar to FIG. 1, partly in section, and showing the cross-sectional shape of the loader arms.

FIG. 5 is an enlarged top plan view of the outer ends of the loader arms showing the associated parts.

FIG. 6 is an enlarged perspective view of the outer ends of the loader arms shown in FIG. 5.

Figure 2:
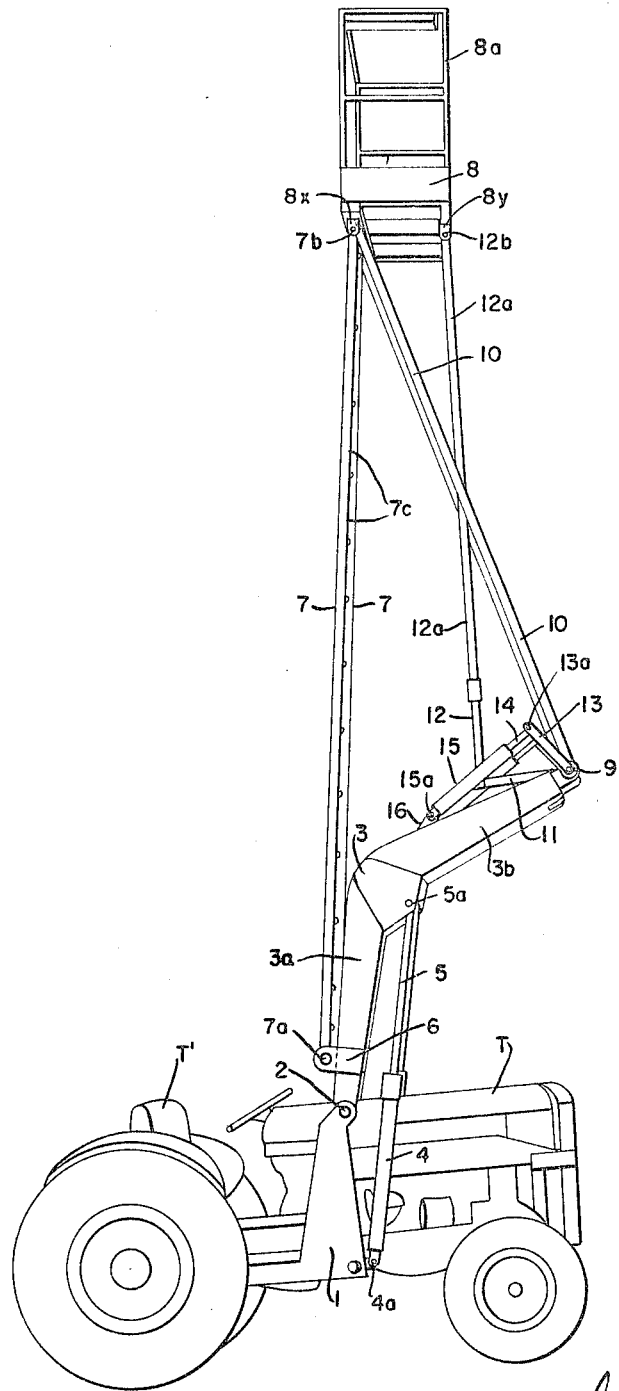
FIG. 2 is a view showing the platform in fully raised or elevated position, and showing the platform disposed in horizontal position.

My front loader attachment, as shown in the drawings, is adapted to be mounted on a tractor T having the customary ground wheels and a power fluid circuit in the usual manner, the tractor shown in the drawing representing a so-called "Davis Loader." However, any other type tractor may be used.

Removably secured to each side of the tractor T are base plates 1 disposed between the driver's seat T' and the front end of the tractor, the plates 1 extending substantially to the top of the tractor hood as shown. Pivotally mounted as at 2 on each of the base plates 1 is a loader arm 3 which is preferably of obtuse angular shape as shown in FIGS. 1 and 2, the rear leg 3a thereof being adapted to normally lie substantially horizontally as shown in FIGS. 1 and 4, while the front leg 3b when the loader arms are in the position shown in FIGS. 1 and 4 extending forwardly and downwardly and terminating adjacent the ground level. Preferably the legs 3a and 3b are hollow and of substantially rectangular cross-section as indicated in FIG. 4; and the front ends of the legs 3b are interconnected together by means of cross-members 3c to form a rigid loader arm unit.

Pivoted as at 4a to the lower portion of each base plate 1 is a power cylinder 4, having a piston arm 5, FIG. 2, the outer end of which piston is pivoted as at 5a to its loader are 3 adjacent the center thereof, suitable control means (not shown) being disposed adjacent the driver's seat T' for admitting fluid from the fluid circuit of the tractor into the cylinders 4 to thereby raise the loader arm unit from its lowered position shown in FIGS. 1 and 4 into its raised or elevated position shown in FIGS. 2 and 3.

Adjacent the rear ends of the inner portions 3a of the loader arms 3 are pairs of ears 6 to which are pivoted as at 7a a pair of parallel struts 7, the outer ends of which struts 7 are pivoted as at 7b to pairs of ears 8x on the underside of platform 8, the ears 8x being disposed at the rear end of the platform. Platform 8 may be provided with the customary railing 8a for the protection of the workmen. In order to facilitate the entry of workmen to and from the platform 8 when in raised position, I preferably provide spaced rungs 7c connecting the parallel struts 7, thus forming a convenient ladder, whereby the workmen may climb from the driver's seat T' up and into the platform 8 when in raised position, the rungs further imparting rigidity to the struts 7.

Journaled in bearings at the outer ends of the outer legs 3b of the loader arms 3 is a transverse rotatable shaft 9, FIGS. 5 and 6, and on shaft 9 are journaled the lower ends of a pair of supporting links 10, the upper end of links 10 being also journaled in the ears 8x coaxially with the journals 7b of the struts 7, hereinbefore referred to. By the above construction the pair of loader arms 3, the pair of struts 7, and the pair of supporting links 10 form a substantially triangular rigid frame structure which pivotally supports the rear end only of the platform 8 when in raised or lowered position, the front end of the platform 8 being supported, leveled, and controlled by a tilting arm 12 hereinafter described.

As shown in FIGS. 5 and 6, fixedly mounted on the shaft 9, is a centrally disposed arm 11 adapted to rotate with the shaft 9, arm 11 being pivotally connected as at 11a to the lower end of a centrally disposed tilting arm 12, the upper portion of the tilting arm 12 being bifurcated as at 12a, FIG. 3, the upper ends of the bifurcations being pivoted as at 12b in ears 8y at the underside of the front end of the platform 8, whereby partial rotation of the shaft 9 will lengthen or shorten the overall length of tilting arm 12–12a which supports the front end of the platform, whereby the platform 8 may be adjusted to tilt on pivots 7b of struts 7 to bring same into desired angular position, or into horizontal position as desired by the workman.

The means for partially rotating shaft 9, as shown in FIGS. 5 and 6, comprises a pair of arms 13 which are also keyed to the shaft 9 so as to rotate therewith, and the outer ends of the arms 13 are pivotally connected as at 13a to pistons 14 which operate in cylinders 15, the inner ends of which cylinders 15 are pivoted as at 15a in ears 16 mounted on the tops of the loader arms 3b, as shown in FIGS. 5 and 6. The cylinders 15 are also connected in the fluid power circuit of the tractor T and controlled by valves (not shown) disposed on the platform 8 so as to be readily accessible to the operator thereon when it is desired to level or to tilt the platform 8 to suit the working conditions.

In operation, the workman of the loader, seated in the tractor driver's seat T' would steer the loader to a position below the elevated work location where the platform is desired, the parts of the attachment during such movement being normally in the position shown in FIG. 1, whereupon the workman by manipulation of the controls adjacent the operator's seat would activate the cylinders 4, causing the loader arms 3 to be swung upwardly on the pivots 7a to bring the platform 8 to the desired elevation adjacent the work. The workman would then ascend the ladder 7c to the platform whether in horizontal or tilted position, and upon reaching the platform would level the same by manipulation of controls which activate the cylinders 15, thus bringing the platform 8 to a horizontal or tilted position, as desired, in which position the platform 8 would be supported by the ladder 7–7c pivoted to the rear end of the platform, while the front end of the platform 8 is supported by the tilting arm 12–12a. The provision of the ladder 7–7a to and from the platform 8 provides a safety feature in the event of malfunction of the parts of the loader, and moreover, renders the loader operable by a single workman. The loader attachment is readily detachable from the tractor. The amount and speed of tilt of the platform 8 can be varied by varying the length of arms 13 or arm 11.

I do not limit my invention to the exact form shown in the drawings, for obviously changes may be made therein within the scope of the claims.

I claim:

1. A front loader attachment for tractors having a fluid power circuit, comprising base plates mounted on each side of the tractor; a pair of parallel angularly shaped loader arms pivotally connected at their rear ends to said base plates respectively, and having their rear legs normally extending substantially horizontally and parallel with the longitudinal axis of the tractor, the front legs of the arms extending forwardly and downwardly beyond the front end of the tractor to points adjacent the ground level; means interconnecting the arms to form a rigid unit; an axially disposed platform; converging pairs of parallel struts pivotally connecting the front and rear end portions of the loader arms with coaxial pivots disposed at the rear end of the platform; means for raising and lowering said loader arms; a shaft journaled in the loader arms; an arm keyed to said shaft; a link pivotally connected to the arm and pivotally connected to the front end of said platform; and means for revolving said shaft to control the angle of tilt of the platform in any adjusted height of the platform.

2. In an attachment as set forth in claim 1, a spaced series of rungs connecting the pair of rear struts, thereby forming a ladder leading to and from the platform.

3. In an attachment as set forth in claim 1, said means for raising the loader arms comprising cylinders in the fluid power cricuit pivoted on said base plates below the loader arms; and pistons in said cylinders having rods pivotally connected to said arms adjacent their mid-lengths, whereby the arms may be raised from normal substantially horizontal positions into substantially vertical positions.

4. In an attachment as set forth in claim 1, said means for revolving said shaft comprising other arms fixed on said shaft; cylinders in the fluid power circuit pivoted on the front legs of the loader arms; and pistons in said cylinders having rods pivotally connected to said other arms, whereby when the shaft is rotated the link will be displaced longitudinally in order to rotate the platform on said coaxial pivots.

5. A front loader attachment for tractors having a fluid power circuit comprising base plates removably mounted on each side of the tractor intermediate its length; a pair of angularly shaped parallel loader arms pivotally connected at their rear ends to said base plates respectively, and having their rear legs normally extending substantially horizontally and parallel with the longitudinal axis of the tractor, the front legs of the arms extending forwardly and downwardly beyond the front end of the tractor to points adjacent the ground level; means interconnecting the arms to form a rigid unit; an axially disposed platform; converging pairs of parallel struts pivotally connecting the front and rear end portions of the loader arms with coaxial pivots disposed at the rear end of the platform; means for raising and lowering said loader arms; a shaft journaled in the outer ends of the loader arms; an arm keyed to said shaft; a bifurcated link pivotally connected to the arm and having its bifurcations pivotally connected to the front end of said platform; and means for revolving said shaft to control the angle of tilt of the platform in any adjusted height of the platform.

6. In an attachment as set forth in claim 5, a spaced series of rungs connecting the pair of rear struts, thereby forming a ladder leading to and from the platform.

7. In an attachment as set forth in claim 5, said means for raising the loader arms comprising cylinders in the fluid power circuit pivoted on said base plates below the loader arms; and pistons in said cylinders having rods pivotally connected to said arms adjacent their mid-lengths, whereby the arms may be raised from normal substantially horizontal positions into substantially vertical positions.

8. In an attachment as set forth in claim 5, said means for revolving said shaft comprising other arms fixed on said shaft; cylinders in the fluid power circuit pivoted on the front legs of the loader arms; and pistons in said cylinders having rods pivotally connected to said other arms, whereby when the shaft is rotated the bifurcated link will be displaced longitudinally in order to rotate the platform on said coaxial pivots.

9. A front loader attachment for tractors having a fluid power circuit comprising base plates mounted on each side of the tractor intermediate its length; a pair of parallel loader arms pivotally connected at their rear ends with said base plates respectively, said arms being of obtuse angular shape having their rear legs normally extending substantially horizontally and parallel with the longitudinal axis of the tractor, the front legs of the arms extending forwardly and downwardly beyond the front end of the tractor to points adjacent the ground level; means connecting the arms to form a rigid unit; an axially disposed platform; a pair of parallel struts pivotally connecting the rear end portions of the rear legs of the arms with the rear end of the platform; a second pair of parallel struts pivotally connecting the outer ends of the front end portions of the front legs of the arms with the rear end of the platform coaxially of the connections of the first pair of struts thereto; means for raising and lowering said loader arms; a shaft journaled in the loader arms; a leveling arm keyed to said shaft; a link pivotally connected to the leveling arm and pivotally connected to the front end of said platform; and means for revolving said shaft to control the angle of tilt of the platform in any adjusted height of the platform.

10. In an attachment as set forth in claim 9, a spaced series of rungs connecting the first pair of struts, thereby forming a ladder leading to and from the platform.

11. In an attachment as set forth in claim 9, said means for raising the loader arms comprising cylinders in the fluid power circuit pivoted on said base plates below the loader arms; and pistons in said cylinders having rods pivotally connected to said arms adjacent their mid-lengths, whereby the arms may be raised from normal substantially horizontal positions into substantially vertical positions.

12. In an attachment as set forth in claim 9, said means for revolving said shaft comprising other arms fixed on said shaft; cylinders in the fluid power circuit pivoted on the front legs of the loader arms; and pistons in said cylinders having rods pivotally connected to said other arms, whereby when the shaft is rotated the link will be displaced longitudinally in order to rotate the platform on said coaxial pivots.

13. A front loader attachment for tractors having a fluid power circuit comprising base plates removably mounted on each side of the tractor adjacent its mid-length; a pair of parallel loader arms pivotally connected at their rear ends with said base plates respectively, said arms being of obtuse angular shape having their rear legs normally extending substantially horiozntally and parallel with the longitudinal axis of the tractor, the front legs of the arms extending forwardly and downwardly beyond the front end of the tractor to points adjacent the ground level; means connecting the front ends of the arms to form a rigid unit; an axially disposed platform; a pair of parallel struts pivotally connecting the rear end portions of the rear legs of the arms with the underside of the rear end of the platform; a second pair of parallel struts pivotally connecting the outer ends of the front end portions of the front legs of the arms with the underside of the rear end of the platform coaxially of the connections of the first pair of struts thereto; means for raising and lowering said loader arms; a shaft journaled in the outer ends of the loader arms; a leveling arm keyed to said shaft; a bifurcated link pivotally connected to the leveling arm and having its bifurcations pivotally connected to the front end of the underside of said platform; and means for revolving said shaft to control the angle of tilt of the platform in any adjusted height of the platform.

14. In an attachment as set forth in claim 13, a spaced series of rungs connecting the pair of struts forming a ladder leading to and from the platform.

15. In an attachment as set forth in claim 13, said means for raising the loader arms comprising cylinders in the fluid power circuit pivoted on said base plates below the loader arms; and pistons in said cylinders having rods pivotally connected to said arms adjacent their mid-lengths, whereby the arms may be raised from normal substantially horizontal positions into substantially vertical positions.

16. In an attachment as set forth in claim 13, said means for revolving said shaft comprising other arms fixed on said shaft; cylinders in the fluid power circuit pivoted on the front legs of the loader arms; and pistons in said cylinders having rods pivotally connected to said other arms, whereby when the shaft is rotated the bifurcated link will be displaced longitudinally in order to rotate the platform on said coaxial pivots.

References Cited by the Examiner

UNITED STATES PATENTS

| | | | |
|---|---|---|---|
| 2,672,377 | 3/1954 | Werner | 182—2 |
| 2,767,868 | 10/1956 | Wagner | 182—2 |
| 2,996,196 | 8/1961 | Podlesak | 182—2 |
| 3,166,153 | 1/1965 | Reed | 182—2 |

REINALDO P. MACHADO, *Primary Examiner.*